US008162171B2

(12) United States Patent
Seehoff et al.

(10) Patent No.: US 8,162,171 B2
(45) Date of Patent: Apr. 24, 2012

(54) APPLE SAVER (75) Inventors: Gary Seehoff, Encino, CA (US); Bryan Golden, Ventura, CA (US)

(73) Assignee: Evriholder Products, LLC, Anaheim, CA (US)

( * ) Notice: Subject to any disclaimer, the term of this patent is extended or adjusted under 35 U.S.C. 154(b) by 296 days.

(21) Appl. No.: 12/115,714

(22) Filed: May 6, 2008

(65) Prior Publication Data

US 2009/0169713 A1 Jul. 2, 2009

Related U.S. Application Data (63) Continuation-in-part of application No. 12/046,350, filed on Mar. 11, 2008, now Pat. No. 8,074,829, which is a continuation-in-part of application No. 29/299,434, filed on Dec. 26, 2007, now Pat. No. Des. 575,993.

(51) Int. Cl.
*B65D 81/24* (2006.01)

(52) U.S. Cl. ............... 220/757; 206/521.2; 220/669; 220/810; 220/574

(58) Field of Classification Search ............... 206/521.2; 220/669, 757, 810, 574
See application file for complete search history.

(56) References Cited

U.S. PATENT DOCUMENTS

| 4,256,243 | A | * | 3/1981 | Bianchi et al. | 224/244 |
| 4,478,348 | A | * | 10/1984 | Cook | 220/318 |
| 6,789,683 | B1 | * | 9/2004 | Fisher | 210/465 |
| 6,832,390 | B1 | * | 12/2004 | Kleinert et al. | 2/22 |
| 2004/0118861 | A1 | * | 6/2004 | Bergman et al. | 220/756 |
| 2005/0249850 | A1 | * | 11/2005 | Scalise | 426/410 |

* cited by examiner

*Primary Examiner* — Anthony Stashick
*Assistant Examiner* — Elizabeth Volz (57) ABSTRACT A device includes an upper portion, a lower portion including a flat bottom portion, and a retaining strap connected to the upper portion at a first connector and removably connected to a second connector. The upper portion is adapted to removably connect with a half of an apple.

14 Claims, 8 Drawing Sheets

APPLE SAVER

CROSS-REFERENCE TO RELATED APPLICATION

This is a continuation-in-part of application Ser. No. 12/046,350, filed on Mar. 11, 2008 now U.S. Pat. No. 8,074,829, which is a continuation-in-part of application Ser. No. 29/299,434 filed Dec. 26, 2007 U.S. Pat. No. D. 575,993.

BACKGROUND

1. Field

This invention relates to apple protection, and more particularly to an apple preservation and freshness saver.

2. Description of the Related Art

Many people consume apples daily and weekly. Many of these people only use a portion of an apple, which can usually be half of an apple. In order to keep the remaining apple fresh, people either place the apple in a refrigerator, which can be by itself, in a plastic bag, wrapped in plastic or in aluminum foil. These ways of preserving an apple half has its drawbacks. Mainly, air is allowed to interact with most of the unprotected surface of the apple allowing oxidation. This escalates the deterioration of the apple half.

Further, the apple half saved can be damaged by other items bumping into the apple half rolling over, etc., which also escalates deterioration by bruising and can also alter the shape of the apple half.

SUMMARY

A device includes an upper portion, a lower portion including a flat bottom portion, and a retaining strap connected to the upper portion at a first connector and removably connected to a second connector. The upper portion is adapted to removably connect with a half of an apple.

Another embodiment presented is an apple holder including an apple placement portion, a flat lower portion connected to the apple placement portion, and an elastomeric retaining strap connected to the apple placement portion. The retaining strap is adapted to hold a half of an apple in place on the apple placement portion.

A method includes placing a half of an apple in an apple storage device, stretching a retaining strap connected at a first portion of the apple storage device over the half of an apple, and attaching a locking portion of the retaining strap to a hook portion of the apple storage device. The apple storage device protects the half of apple from oxidation.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The invention generally relates to an apple saver system. Referring to the figures, exemplary embodiments of the invention will now be described. The exemplary embodiments are provided to illustrate the invention and should not be construed as limiting the scope of the invention.

Figure 1:
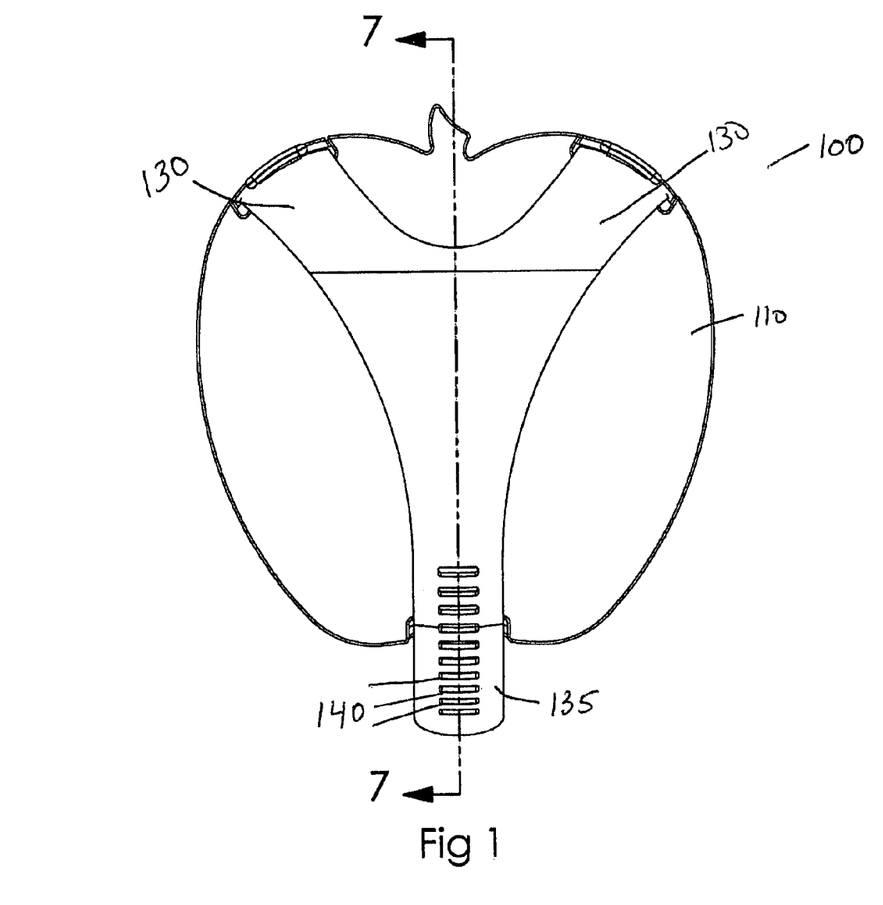
FIG. 1 illustrates a top view of an embodiment of an apple saver.

FIG. 1 illustrates a top view of an embodiment of apple saver 100. As illustrated, apple saver 100 includes a top portion 110, anchored portions 130 of a holding strap, adjustment portion 135 of the holding strap, and locking portions 140 of the holding strap. As can be seen from FIG. 1, top portion 110 has a perimeter in the shape of an apple's perimeter from a bisected apple. In one embodiment, top portion 110 is flat.

Figure 2:
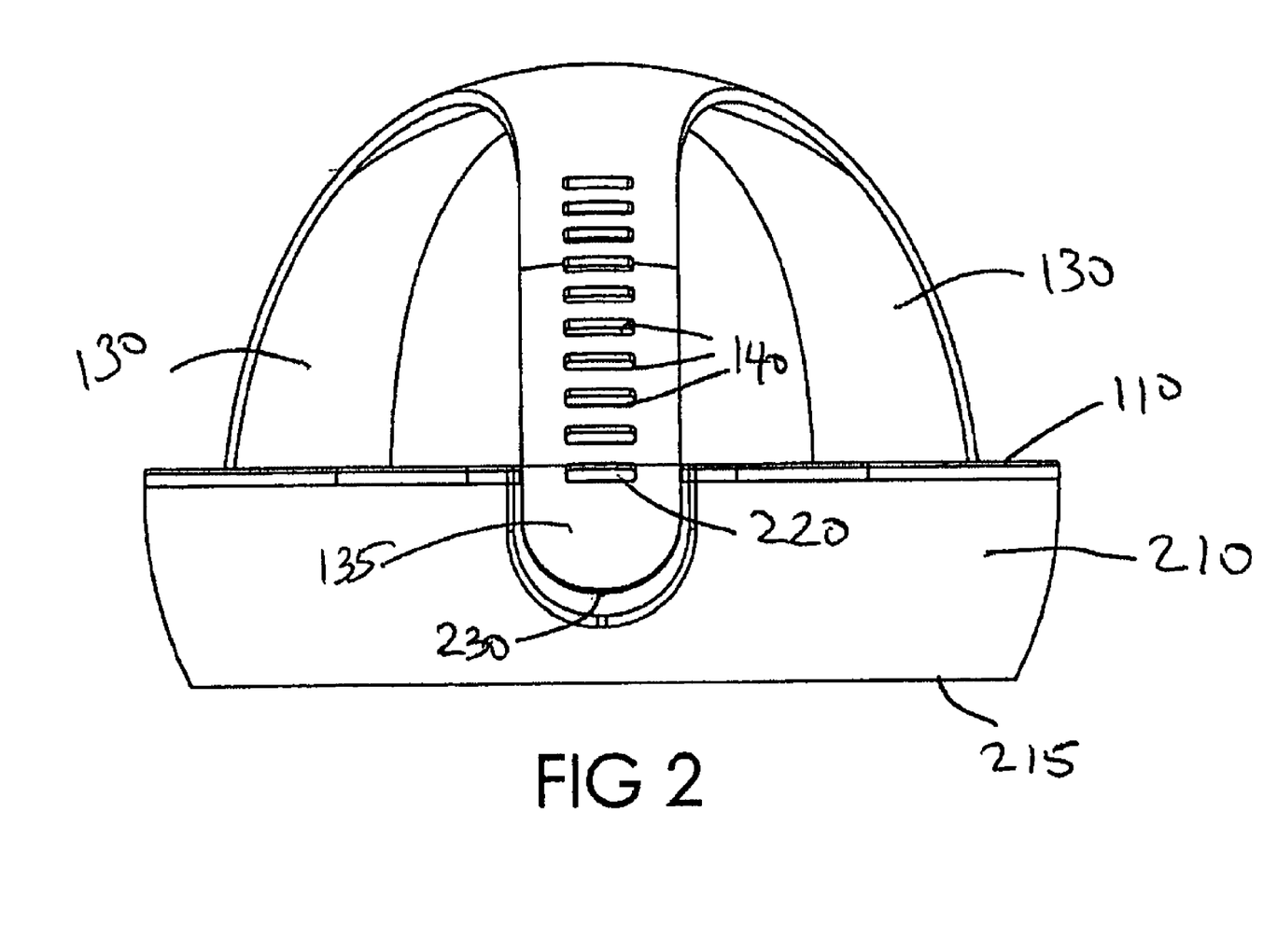
FIG. 2 illustrates a front view of the apple saver illustrated in FIG. 1.

FIG. 2 illustrates a front view of apple saver 100. As illustrated, apple saver 100 includes an indented or cut-away portion 230 that is sized to hold the adjustment portion 135 of the holding strap so that when the adjustment portion 135 is placed in the indented portion 230, the surface of the adjustment portion 135 is flush with side portion 210. Apple saver 100 includes a locking tab 220 within the indented portion 230 that locks the holding strap when the locking tab 220 is inserted through a locking portion 140. In use, an apple sliced in half would be placed onto top portion 110 with its top (i.e., portion with a stem) faced towards the rear of apple saver 100 (i.e., away from indented portion 230).

Figure 3:
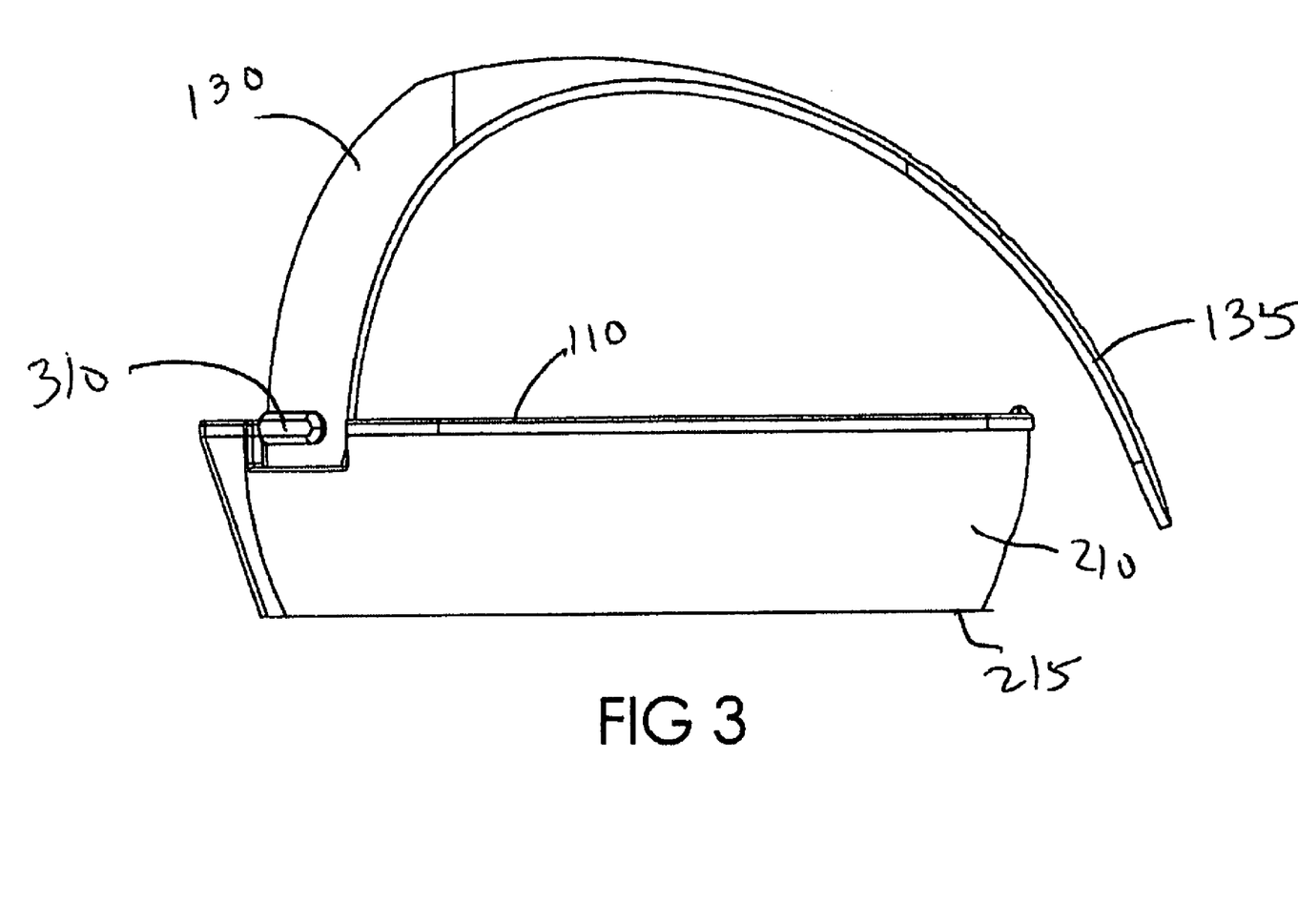
FIG. 3 illustrates a left side view of the apple saver illustrated in FIG. 1.
Figure 4:
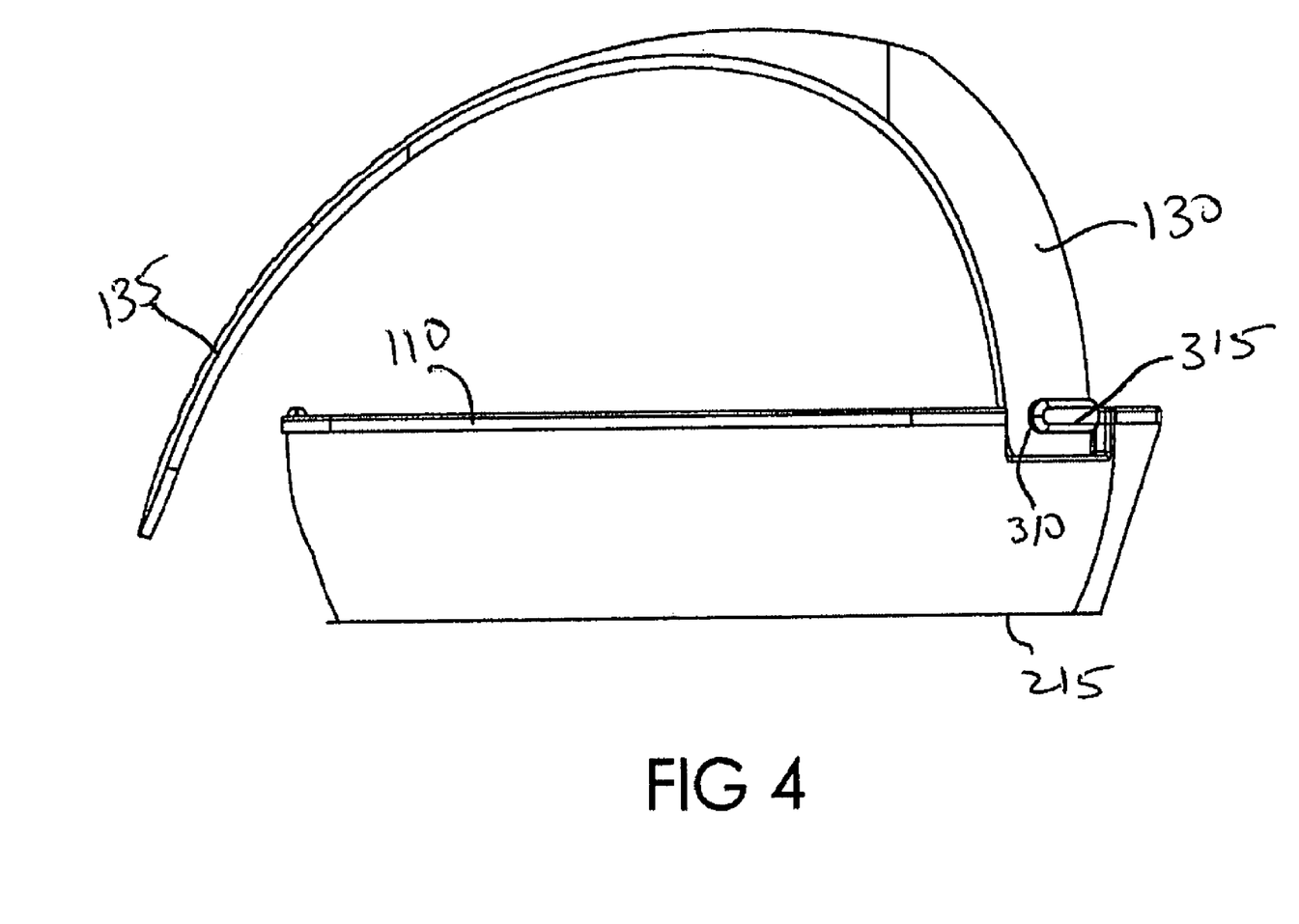
FIG. 4 illustrates a right side view of the apple saver illustrated in FIG. 1.

FIG. 3 and FIG. 4 illustrate left and right views, respectively, of apple saver 100. As illustrated, apple saver 100 includes a flat bottom portion 215, and a locking portion 310 of anchored portions 130. Flat bottom portion 215 keeps the apple saver from rolling or tipping, for example when placed in a refrigerator or on a counter. In one embodiment, the top portion 110 and the bottom portion 215 are sonic welded.

Figure 5:
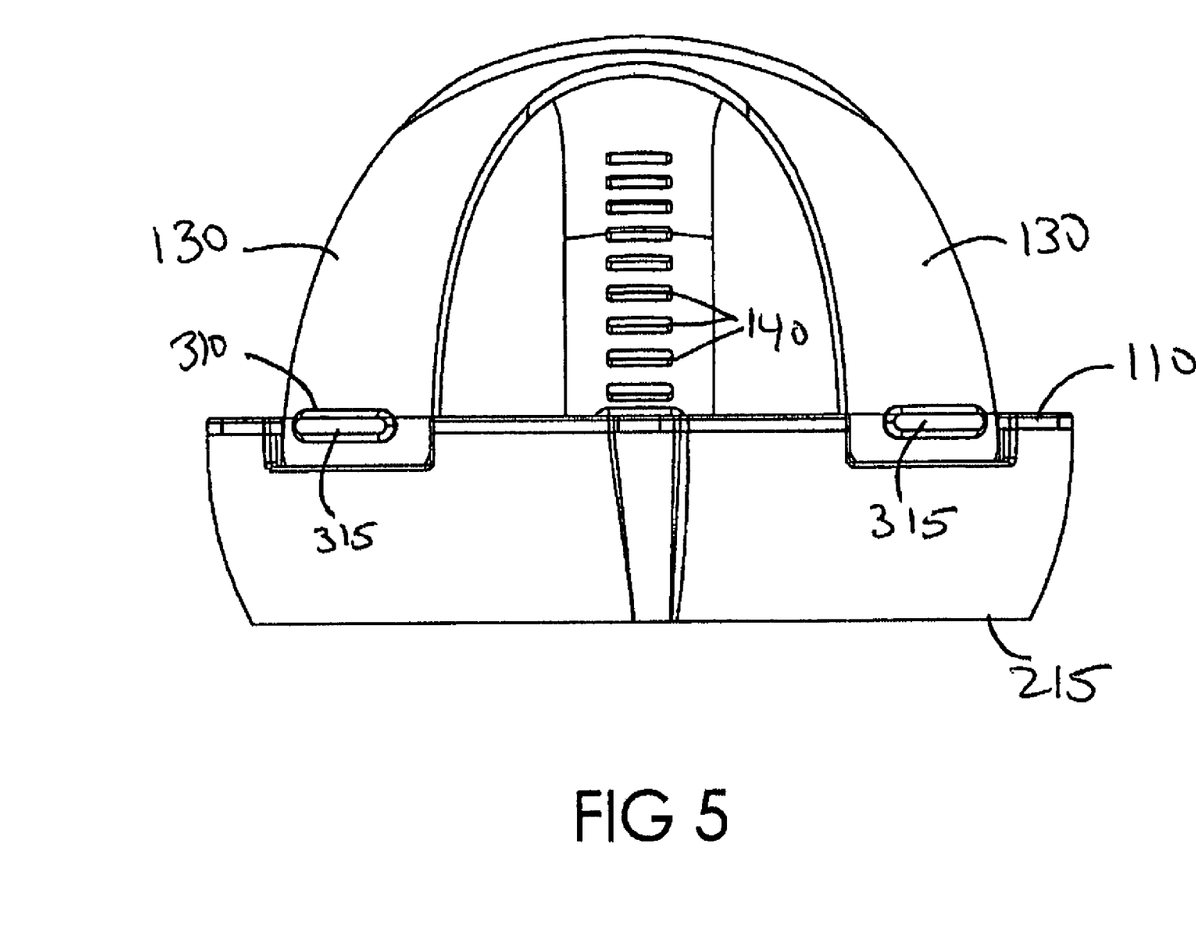
FIG. 5 illustrates a rear view of the apple saver illustrated in FIG. 1.

FIG. 5 illustrates a rear view of apple saver 100. Locking tabs 315 project from the front of apple saver 100 and are received within locking portions 310 of the anchored portions 130 to anchor the holding strap to the body of the apple saver.

Figure 6:
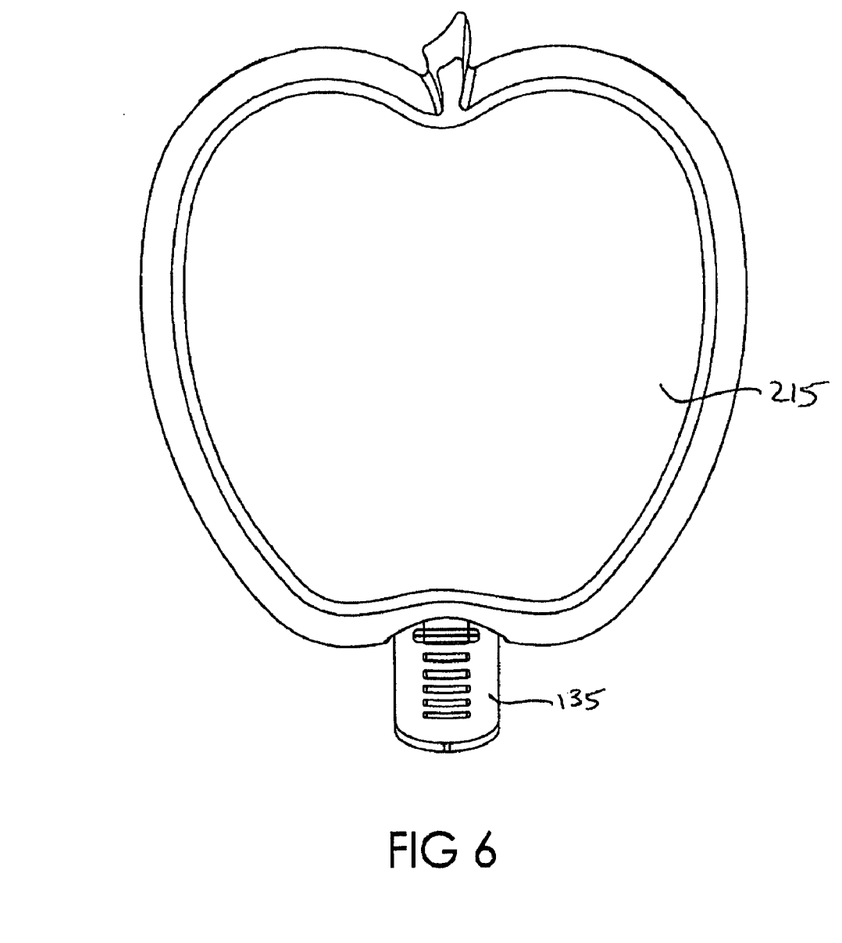
FIG. 6 illustrates a bottom view of the apple saver illustrated in FIG. 1.
Figure 7:
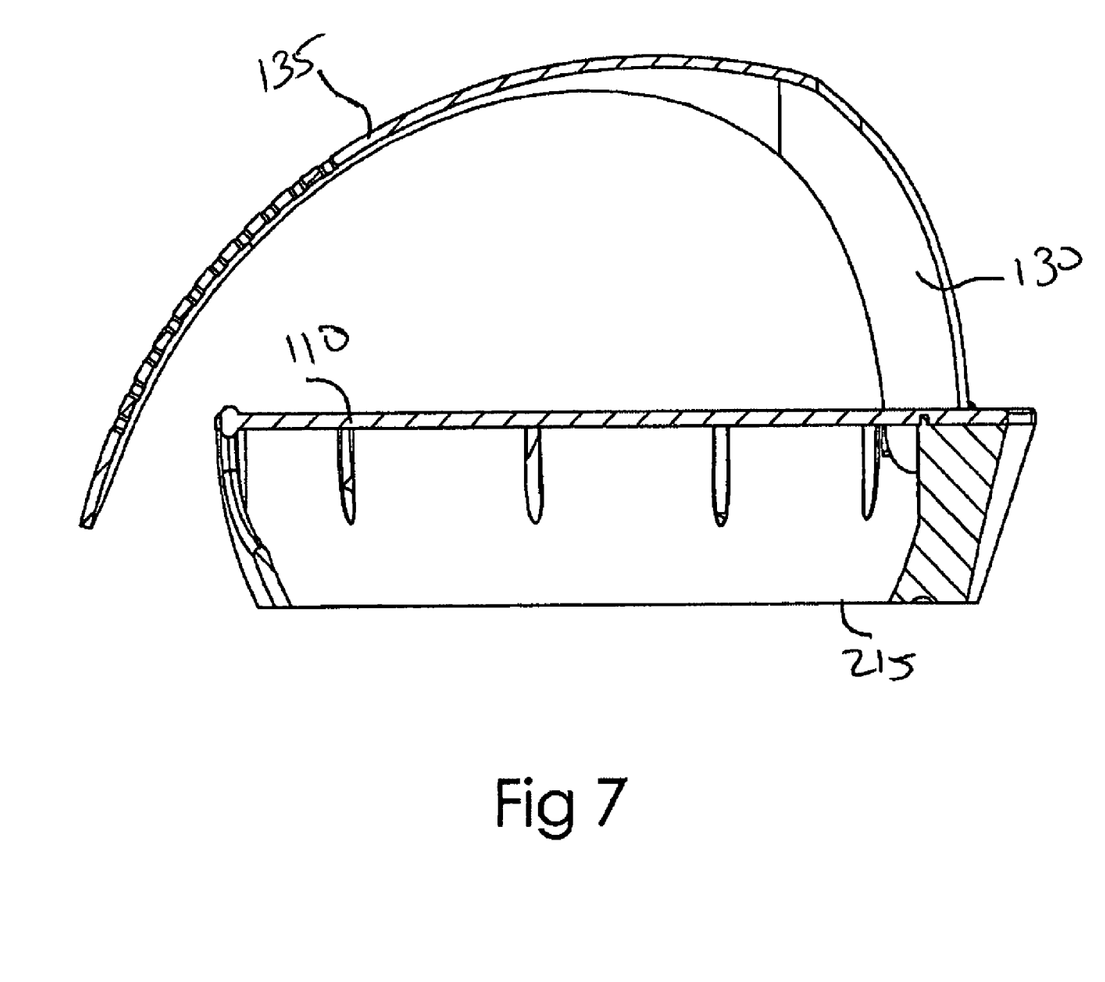
FIG. 7 illustrates a cut-away view of the apple saver illustrated in FIG. 1.
Figure 8:
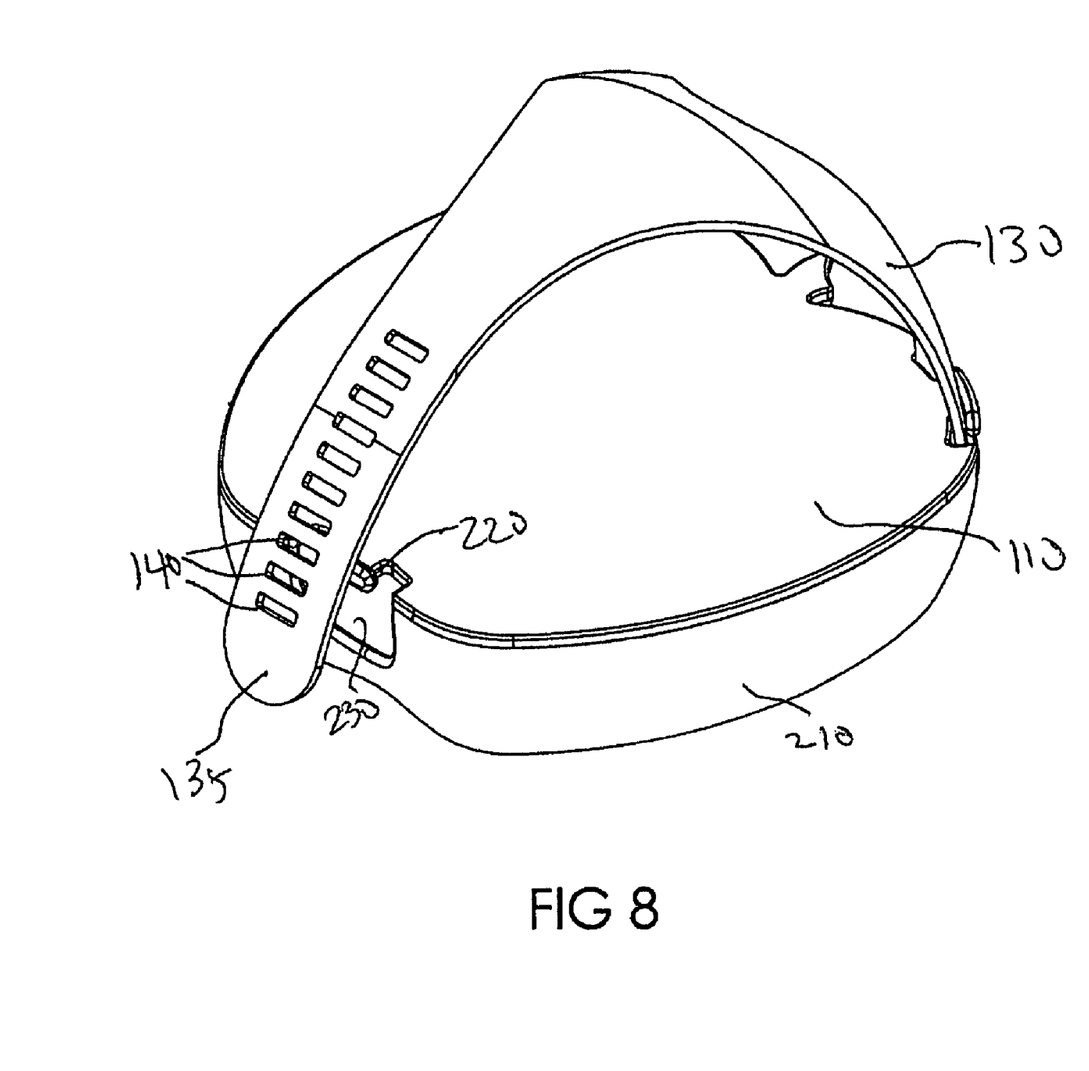
FIG. 8 illustrates a perspective view of the apple saver illustrated in FIG. 1.

FIG. 6 illustrates a bottom view of apple saver 100 and FIG. 7 illustrates a cut-away view of apple saver 100.

In one embodiment apple saver 100 is manufactured using injection molded plastic. In one embodiment, the holding strap is made with TPR (thermal plastic rubber), which is stretched over half of an apple placed in apple saver 100 with the exposed fruit portion placed on top portion 110. In other embodiments, the holding strap can be made of other elastomeric material. Besides the holding strap, in one embodiment apple saver 100 is made from injection molded plastic. In other embodiments, apple saver 100 is made of fiberglass, wood, metal, casting resin, epoxy resin, paper/cardboard, stone, concrete, and ceramics. Besides injection molding, in other embodiments apple saver 100 is made from other processes or techniques, such as lay-up molding (fiberglass), metal casting, metal machining, clay or ceramic casting (Slip casting), forging, high pressure paper or laminate forming, carving (wood), plastic sheet thermo-forming fabrication, resin casting (epoxy or urethane), injection molded plastic with/without TPR co-molded components, etc. It should be noted that the various components of apple saver 100 can each be made of different materials. It should also be noted that apple saver 100 can be made by hand, use robotics or a combination of both.

Apple saver 100 can be made in various sizes so that many different kinds of apples that are sized differently may be stored in apple saver unit 100. In use, the holding strap is pulled over half of an apple to tighten the half of an apple into place and create a substantially air tight seal between the half of an apple and top portion 110. This formed seal prevents the half of an apple to spoil or oxidate (e.g., turn brown) to soon. As a half of an apple is small, when stored in plastic wrap or plastic bags it can easily get indented, bumped, roll over, etc. when placed in a refrigerator. This damages the fruit of the apple portion and hastens spoiling. When the half of an apple is placed in apple saver 100, the half of an apple is protected from other items that could slide into, fall on, roll over, etc. when stored. This is a benefit over plastic bags or wrap that do not physically protect the stored apple portion from other items.

It should also be noted that apple saver unit 100 can be made in various sizes so that many different kinds of apples that are sized differently may be stored in apple saver unit 100.

Other embodiments include various food saver units that are sized and shaped for a variety of different fruits and vegetables. Some examples of these embodiments include food saver units that are sized and shaped for lemons, tomatoes, grapefruit, melons, peaches, plums, nectarines, oranges, onions, cucumbers, etc. Some of these embodiments include a flat top portion. Other embodiments include a top portion including a pit recess area sized to retain a particular fruit or vegetable pit portion. In these embodiments, the food saver unit is shaped and sized to look like the other half of the particular fruit or vegetable. In some of these embodiments, the food saver unit is textured and colored to resemble the particular fruit or vegetable to be useful for a user to recognize and easily find the food saver unit.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
an upper platform portion including a flat upper portion having a size for holding an inner portion of a sliced in half fruit or vegetable;
a lower portion including a flat bottom portion; and
a retaining strap coupled to the upper portion at a first connector and removably coupled to a second connector, wherein the retaining strap removably couples to an outer portion of a sliced in half fruit or vegetable, wherein the retaining strap including a center section having a size wider than an adjustment portion, wherein the adjustment portion including a plurality of locking portions, wherein the locking portions comprise a plurality of openings, and wherein the upper platform portion and the lower portion comprise molded material.

2. The apparatus of claim 1, wherein the retaining strap is made of an elastomer material.

3. The apparatus of claim 1, wherein the flat bottom portion prevents rolling over of the apparatus.

4. The apparatus of claim 1, wherein the upper portion has a perimeter shaped as a fruit or vegetable perimeter.

5. The apparatus of claim 1, wherein the apparatus reduces oxidation of an open sliced side of a fruit or vegetable by forming a substantially air tight seal between the flat upper portion and the inner portion of the sliced in half fruit or vegetable.

6. The apparatus of claim 1, wherein the retaining strap contacts the outer portion of a sliced in half apple.

7. The apparatus of claim 1, wherein the retaining strap comprises a Y-shaped stretchable portion.

8. The apparatus of claim 1, wherein the molded material comprises plastic.

9. The apparatus of claim 1, wherein the restraining strap comprises a pair of anchored portions.

10. The apparatus of claim 9, further comprising a side portion including a pair of locking tabs configured for retaining the anchored portions.

11. A holder, comprising:
a fruit or vegetable placement portion comprising a flat receiving portion sized for holding a half of a fruit or vegetable;
a flat lower portion coupled to the placement portion; and
an elastomeric retaining strap coupled to the placement portion, wherein the retaining strap including a center section having a size wider than an adjustment portion, and the adjustment portion including a plurality of locking portions having a plurality of openings,
wherein the retaining strap couples to an outer portion of half of a fruit or vegetable in place on the placement portion, and the flat receiving portion couples with an inner portion of a half of a fruit or vegetable.

12. The holder of claim 11, wherein the placement portion includes at least one retaining strap holding portion and a retaining strap coupling portion.

13. The holder of claim 11, wherein the placement portion reduces oxidation of an open sliced side of a fruit or vegetable by forming a substantially air tight seal between the flat receiving portion and the inner portion of a half of a fruit or vegetable.

14. The holder of claim 11, wherein the upper portion has a perimeter shaped as a fruit or vegetable perimeter, and the upper portion comprises molded material.

* * * * *